United States Patent [19]

Gabriel et al.

[11] Patent Number: 5,476,687
[45] Date of Patent: Dec. 19, 1995

[54] COATED METAL FASTENER AND COATING COMPOSITION THEREFOR

[75] Inventors: William L. Gabriel, Barrington; Geronimo E. Lat, Prospect Heights; Lawrence S. Shelton, Morton Grove, all of Ill.

[73] Assignee: Illinois Tool Works Inc., Glenview, Ill.

[21] Appl. No.: 868,892

[22] Filed: Apr. 16, 1992

Related U.S. Application Data

[62] Division of Ser. No. 659,236, Feb. 22, 1991, Pat. No. 5,149,237.

[51] Int. Cl.$^6$ ........................................ B05D 1/18
[52] U.S. Cl. .................. 427/435; 427/388.2; 427/388.5
[58] Field of Search ................. 427/388.5, 435, 427/388.2; 411/258

[56] References Cited

U.S. PATENT DOCUMENTS

| | | | |
|---|---|---|---|
| 3,146,142 | 8/1964 | Maly | 411/258 |
| 3,276,576 | 10/1966 | Langas et al. | |
| 3,370,975 | 2/1968 | Semroe | 427/435 |
| 3,814,156 | 6/1974 | Bachmann et al. | 411/378 |
| 3,853,606 | 12/1974 | Parkinson | 427/388.4 |

FOREIGN PATENT DOCUMENTS

| | | | |
|---|---|---|---|
| 1519245 | 7/1970 | Germany. | |
| 671271 | 8/1989 | Switzerland | 427/388.5 |
| 657703 | 9/1951 | United Kingdom. | |
| 1044976 | 10/1966 | United Kingdom | 427/388.5 |

*Primary Examiner*—Diana Dudash
*Attorney, Agent, or Firm*—Schwartz & Weinrieb

[57] ABSTRACT

A process for coating a metal fastener with a coating composition that has a particular affinity for plaster materials is disclosed. The composition comprises a mixture of a copolymer of an aromatic monomer, preferably styrene, and a monomer with $\alpha$, $\beta$ unsaturation with carboxyl groups, preferably maleic anhydride, and a thermoplastic resin disposed within an organic solvent. The resin is preferably polyvinyl acetate, and the solvent can be an aromatic solvent, a ketone, a chlorohydrocarbon, or a mixture there of. The coating composition is disposed within a reservoir, and the fastener is dipped into the composition within the reservoir. The coated fastener is then subsequently dried at approximately ambient temperature.

22 Claims, 1 Drawing Sheet

COATED METAL FASTENER AND COATING COMPOSITION THEREFOR

This application is a division of application Ser. No. 659,236, filed Feb. 22, 1991, now U.S. Pat. No. 5,149,237.

TECHNICAL FIELD OF THE INVENTION

The present invention described herein relates to a coating for metal fasteners. The coating protects the metal fastener and exhibits an attraction for plaster-like materials.

BACKGROUND OF THE INVENTION

Fasteners such as for example nails, staples, and truss plates are utilized extensively in the construction and assembly of countless articles ranging from buildings to fences. The useful life of a fastener is critical to its suitability for a particular purpose. For example, a nail which is not corrosion-resistant is not suited for service where it will be exposed to outdoor weather conditions.

Coatings for fasteners have been developed so as to protect metal fasteners from adverse conditions. A suitable fastener coating must adequately adhere to the fastener. Typically, fasteners are made of carbon steel. Fasteners can also be made of aluminum or copper alloys such as for example bronze. A fastener may be zinc coated or chromate coated before a protective outer coating is applied. A suitable coating should therefore adhere to a variety of metals or metallic surfaces.

Coatings for fasteners impart desirable properties to the fasteners. For example, most protective coatings on disposed metal fasteners provide corrosion resistance, but some coatings enable a fastener to be inserted with less force yet increase the force required to remove the fastener. A fastener coating with both of the above-described properties is disclosed in Lat et al., U.S. Pat. No. 4,964,774. The coating disclosed in the Lat et al. patent comprises a film forming, thermoplastic, predominantly aliphatic polyurethane resin, which is applied onto the fastener in an aqueous medium and then dried thereon.

In Campbell, Jr., U.S. Pat. No. 2,329,456, a metal coating composition comprising a copolymer of a vinyl halide, a vinyl ester of a lower saturated fatty acid and an aliphatic $\alpha$, $\beta$-mono-olefinic carboxylic acid that exhibits improved adhesion to smooth metal surfaces is disclosed. The adhesion of the coating composition is improved by co-polymerizing the vinyl halide and the aliphatic vinyl ester with small quantities of an unsaturated carboxylic acid.

In Parkison, U.S. Pat. No. 3,853,606 a metal fastener coating that adheres to wood is disclosed. The coating comprises approximately 50 to 80 percent by weight resin solids of a rosin-like resin, which is dispersed approximately 20 to 50 percent by weight of an ethylene copolymer or terpolymer containing carboxyl or esterified carboxyl groups.

Even if coated, metal fasteners frequently do not satisfactorily anchor themselves within porous materials such as for example plaster due to the chemical and physical properties of the plaster due to the chemical and physical properties of the porous materials. Generally, the binder polymer within the plaster must be compatible, chemically, to the fastener overcoat for good adhesion to develop upon drying.

Frequently, plaster-like materials such as, for example spackling compound are applied as a finish over sheets of plasterboard which have been fastened to building frames. If the fastener used does not exhibit some sort of affinity for the spackling compound, the spackling compound will not adhere to those portions of the fastener not embedded within the plasterboard. If the spackling compound does not adhere to the exposed portions of the fastener, the finish coating will be uneven or pocked, which is unacceptable.

Therefore, a metal fastener coating which exhibits some affinity or attraction to plaster or plaster-like materials would be highly desirable.

SUMMARY OF THE INVENTION

The present invention is directed toward a coated metal fastener and a coating therefor. The coating composition composition reduces penetration force, increases withdrawal force, and resists chipping or tearing away of the article or object into which the fastener is embedded or otherwise anchored. The coating further protects the metal fastener from corrosion. The coating has a strong attraction to plaster and plaster-like materials, which more readily adhere to the coated fastener herein disclosed.

According to this invention, the coating composition is a combination of two resins. The first resin is a copolymer of an aromatic monomer, preferably styrene, and a monomer with $\alpha,\beta$ unsaturation associated with carboxyl groups or partially esterified carboxyl groups, preferably maleic anhydride. The second resin is a thermoplastic resin, preferably vinyl acetate.

The coating composition is prepared by combining approximately 4% to 15%, preferably approximately 7.5 weight percent of the copolymer resin with approximately 3% to 16%, preferably approximately 5 weight percent of the thermoplastic resin within an inert organic solvent or mixture of solvents. The ratio of the first resin to the second resin is approximately 80 to 20 to approximately 20 to 80 parts by weight.

The inert organic solvents can be aromatic solvents, ketones, chlorohydrocarbons, and mixtures thereof. Preferred solvents are toluene, methylethylketone, and chloroethane, 1,1,1 trichloroethane being the most preferred. The organic solvent generally comprises approximately 80 to 90 percent by weight of the coating composition, preferably approximately 87 percent by weight.

The coating composition optionally contains a dye which, if present is in an amount of approximately 0.1% to 1%, preferably approximately 0.2 percent by weight of the composition.

The coating composition is suited for application onto metal fasteners made preferably of carbon steel. The fastener itself may be a nail, staple, or truss plate.

The thermoplastic, polymeric coating is applied to the fastener by dipping, spraying or roller coating the fastener with the coating composition within an inert organic solvent. A reservoir filled with the coating composition is provided for this purpose. The liquid coating composition is then cured and dried upon the fastener by conventional means. The coating is dried upon the fastener at approximately ambient temperature. The thickness of the dried coating composition upon the fastener is approximately 0.2 to 2 millimeters, preferably about 0.5 to about 1.5 millimeters. The cured coating composition is sufficiently brittle so that, if bridges of dried coating should form between individual fasteners, these bridges can be broken without damaging the coating upon either fastener.

The thermoplastic, polymeric coating is applied by any one of the above-described methods so as to coat a substantial part of the fastener, preferably the entire fastener.

BRIEF DESCRIPTION OF THE DRAWINGS

Various other objects, features, and attendant advantages of the present invention will become more fully appreciated from the following detailed description, when considered in connection with the accompanying drawings, in which like reference characters designate like or corresponding parts throughout the several views, and wherein.

DETAILED DESCRIPTION OF THE PREFERRED EMBODIMENT

Figure 1:
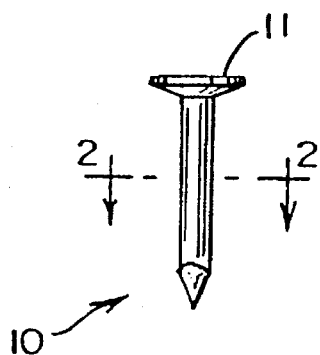
FIG. 1 is an elevational view of a nail constituting a preferred embodiment of this invention.

The present invention is directed toward a coating composition for a metal fastener, a metal fastener coated with the coating composition and a method for coating the metal fastener with the coating composition The coating composition is a combination of a copolymer and a thermoplastic resin. In particular the copolymer contains an aromatic monomer and a monomer with $\alpha,\beta$ unsaturation associated with carboxyl groups or partially esterified carboxyl groups. The copolymer and the resin are combined within an inert organic solvent and are applied to the metal fastener by means of any suitable method, preferably dipcoating.

Aromatic monomers suitable for use in accordance with the invention are styrene, vinyl toluene $\pi$-methylstyrene, $\alpha$-methylstyrene, divinylbenzene and the like. Styrene is preferred due to its greater availability and lower cost. Polymers made from aromatic monomers tend to be stiff and clear. Therefore, the aromatic monomer provides a desire or predetermined degree of rigidity to the cured coating.

Aromatic monomers are commonly copolymerized with other monomers. Monomers with $\alpha,\beta$ unsaturation with carboxyl or partially esterified carboxyl groups copolymerize with aromatic monomers so as to form linear, strong polymers. After copolymerization, a portion of the anhydride within the resulting polymer can be partially esterified, in which case a linear aromatic polyester resin is formed.

Examples of monomers with $\alpha,\beta$ unsaturation with carboxyl groups are maleic anhydride, maleic acid and fumaric acid. The preferred monomer is maleic anhydride.

Styrene/maleic anhydride copolymers preferred for use within the coating composition disclosed herein are preferably unmodified copolymers of styrene and maleic anhydride monomers with mole ratios of styrene to maleic anhydride monomer of approximately 1 to 1 to approximately 3 to 1. The copolymer has a relatively high melting temperature, within the range of approximately 55° C. to 170° C. and a high thermal stability. The number average molecular weight of the resin is approximately 1600 to 2800. The copolymer has an acid number of approximately 100 to 500. The acid number is the number of milligrams of potassium hydroxide necessary to neutralize the acid within one gram of substance.

The copolymer has a melt viscosity of approximately 15 cps to about 55 cps in a mixture that is about 15 percent nonvolatile material. The copolymer is soluble within a number of organic solvents. The solution viscosity and the solubility of the copolymer within the solution both increase as the ratio of the styrene monomer to the maleic anhydride monomer increases.

The copolymer can be either in the anhydride or partial ester form. The copolymer can be partially esterified by treating the styrene/maleic anhydride copolymer with an alcohol such as for example ethylene glycol. The preferred degree of esterification of the copolymer is approximately 35 percent to 50 percent.

Thermoplastic synthetic resin adhesives comprise a variety of polymerized materials such as for example polyvinyl acetate, polyvinyl butyryl, polyvinyl alcohol, and other polyvinyl resins. Acrylic and methacrylic acid ester resins and various other synthetic resins such as for example polyisobutylene, polyamides, coumarone-indene products and silicones also exhibit adhesive properties desirable for the coating composition disclosed herein. The thermoplastic resins usually have permanent solubility and fusibility so that they creep under stress and soften when heated. The preferred thermoplastic resin which is to be used in accordance with the present invention is polyvinyl acetate (PVAc) which has demonstrated affinity for plaster and plaster-like compositions.

The PVAc resin used within the composition disclosed herein can be in the form of beads such as for example VINAC beads manufactured by Air Products and Chemicals Inc. VINAC is a registered trademark of Air Products and Chemicals, Inc. PVAc resins are typically small, glass-like beads which have a number of uses such as for example laminating, label and hot melt adhesives, pigmented and grease-proof paper coatings, over print varnishes, industrial lacquers and coatings, printing inks, and textile sizes and finishes. PVAc resins are resistant to attack by means of weak acids, alkalies and salts, but are soluble within many organic solvents. PVAc resins generally have a softening point above approximately 120° C. to 165° C. Suitable PVAc resins generally have a molar viscosity of approximately 10 cps to 75 cps within an organic solvent. The number average molecular weight of the PVAc resin is approximately 90,000 to 500,000. The resin contains no more than approximately 2% by weight volatile components.

The ratio of the styrene/maleic anhydride copolymer to PVAc resin within the coating composition is approximately 20:80 to 80:20 parts by weight. The copolymer and resin are combined within an inert organic solvent. Organic solvents suitable for this application can be an aromatic solvent, a ketone, a chlorohydrocarbon and mixtures thereof. Solvents that will evaporate quickly at room temperature are preferred. Preferred solvents are toluene, methylethylketone and chloroethane, most preferably 1,1,1 trichloroethane. The organic solvent generally constitutes approximately 70 to 95 percent by weight of the coating composition, most preferably approximately 87 percent by weight.

The coating is then applied to the fastener by means of dipping, spraying, roller coating or any other standard technique, such as for example, by means of any of the techniques disclosed in Lat et al., U.S. Pat. No. 4,964,774, the teachings of which are incorporated herein by reference. The liquid coating composition preferably has a low viscosity so that drops of coating do not form upon the fastener when it is removed from the coating bath.

The coated metal fastener is then removed from the coating bath and is dried at approximately ambient temperature. This is below the softening temperature of the thermoplastic resin within the coating composition. Preferably the temperature is within the range of about 60° F. (15° C.) to 100° F. (38° C.). The polymer within the coating may or may not be cross-linked. The degree of cross-linking in a particular instance is dependent upon the specific composition of the resin dispersed within the solvent and the cross-linking agent, and/or accelerators that may be present. After the coated fasteners are removed from the coating bath, bridges of coating may form between individual fasteners. When dry, these bridges are brittle and break easily without damaging the coating disposed the fasteners to which the bridges are attached.

EXAMPLE 1

Coating Composition

A coating composition was prepared in which methylethylketone (MEK) solvent (150 lbs), 1,1,1 trichloroethane solvent (130 lbs) and toluene solvent (12 lbs) were combined. A styrene/maleic anhydride copolymeric resin (35 lbs) (2625 A Resin obtained from Atochem, Inc.) and a polyvinyl acetate resin (25 lbs) (VINAC B-100 Resin obtained from Air Products Corp.) were uniformly dispersed within the organic solvent mixture using mechanical mixing. MEK (78 lbs) and 1,1,1 trichloroethane (40 lbs) were then added to the dispersed mixture along with a dye (1502) (Orazol dye from Ciba Giegy Corp.). The mixture was again mixed using mechanical agitation until uniform. A summary of the coating composition is set forth in Table 1 below.

TABLE 1

| Coating Composition | | |
| --- | --- | --- |
| | lb | wt % |
| Methyl Ethyl Ketone | 150 | 31.85 |
| Toluene | 130 | 27.6 |
| 1,1,1 Trichloroethane | 12 | 2.55 |
| Styrene/Malaic Anhydride [2625A Resin (Atochem Inc.)] | 35 | 7.43 |
| Polyvinyl Acetate [VINAC B-100 Resin (Air Products)] | 25 | 5.31 |
| Methyl Ethyl Ketone | 78 | 16.56 |
| 1,1,1 Trichloroethane Solvent | 40 | 8.49 |
| Dye[1] | 0.94 | 0.2 |
| Total Weight | 470.94 | |

[1]The dye can be, for example, Orazol red G dye or Orazol blue GN dye. Both dyes are available from Ciba Giegy Corp.

The coating composition contained 13±0.25 percent solids, which was determined by means of an evaporation method. The coating composition had an estimated viscosity of approximately 16–18 seconds using a #2 Zahn Cup.

Figure 2:
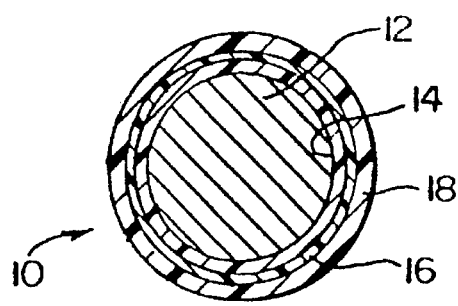
FIG. 2 is a cross-sectional view on a slightly larger scale, as taken along plane 2—2 of FIG. 1 in a direction indicated by means of the arrows.

A coated nail 10, as shown in FIGS. 1 and 2, constitutes a preferred embodiment of this invention. The head 11 of the coated nail 10 is cupped, in a known manner, so as to provide a reservoir for a spackling compound applied over the coated nail 10.

The coated nail 10 has a metal body 12, which is made of carbon steel, preferably AISI C 1008 steel. Its metal surfaces are completely covered with an inner zinc layer 14, an intermediate chromate conversion layer 16, and an outer copolymer/thermoplastic resin coating 18.

The inner zinc layer 14, as applied by means of a known electroplating process, has a thickness of at least 0.5 mm so as to comply with Federal Building Code FF-N-105B, which is referenced to ASTM Specification A641, Class 1, Type 2. Preferably, as applied over the inner zinc layer 14 by means of a known chromating process, the chromate conversion layer 16 is a golden yellow (yellow iridescent) chromate conversion layer. A dark olive drab or dark black chromate conversion layer may be alternatively applied over the zinc layer 14, if desired.

As applied over the zinc and chromate conversion layers by means of the method disclosed herein, preferably within about two weeks after such layers are applied, the copolymer/thermoplastic resin coating 18 has a thickness of approximately 0.2 mm to 2 mm, preferably approximately 0.5 mm to 1.5 mm.

Figure 3:
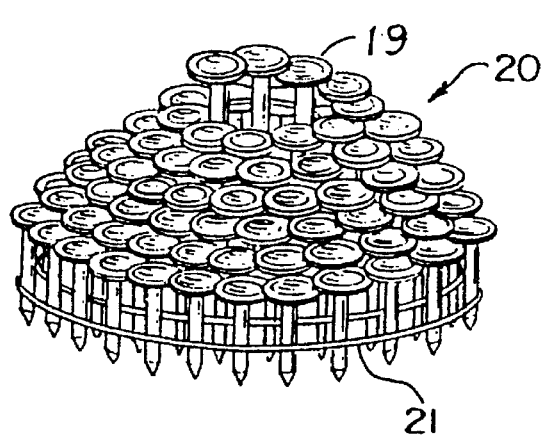
FIG. 3 is a simplified perspective view of a collated coil of nails.

As shown in FIG. 3, a plurality of coated nails 20, each of which is similar to the coated nail 10, are collated into a coil, to be coated generally as disclosed in Langas et al. U.S. Pat. No. 3,276,576. Each nail 20 has a cupped head 19 similar to the cupped head 11 of the coated nail 10.

The nails are contained by means of a rubber band 21 and are formed into a coil 20. The metal surfaces of each coated nail 20 are completely covered with an inner zinc layer 14, as described above, and with an intermediate chromium conversion layer 16, as described above.

Figure 4:
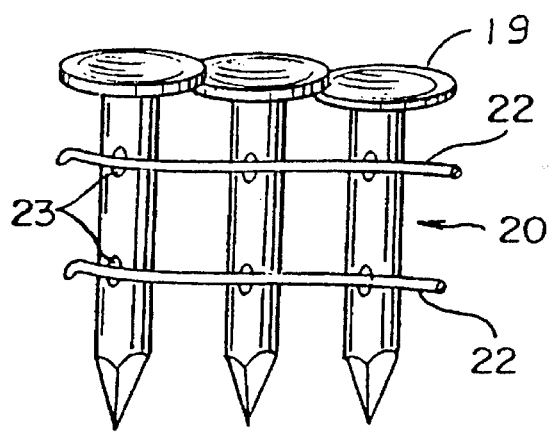
FIG. 4 is an elevational view on a slightly larger scale, showing a fragmentary, collated strip of nails from the coil of FIG. 3, each of the nails being similar to the nail of FIG. 1.

FIG. 4 is a detailed view of a few coated nails in a coil which fits a magazine (not shown) of a fastener driving tool. The wires 22 are affixed to the coated nails 20 by means of welds 23. The zinc and chromate conversion layers are applied to each coated nail 20 before such coated nail 20 is situated between and welded to the wires 22.

Figure 5:
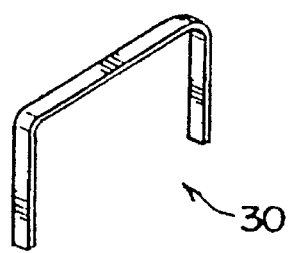
FIG. 5 is a perspective view of a staple constituting an alternative embodiment of this invention.

A coated staple 30, as shown in FIG. 5, constitutes another embodiment of this invention.

The coated staple 30 has a metal body, which is made of carbon steel, preferably AISI C 1008 steel. Its metal surfaces are completely covered with an inner zinc layer, as described above, an intermediate chromate conversion layer, as described above, and an outer copolymer/thermoplastic resin coating, as described above.

The coated staple 30 may be one of a series (not shown) of similar staples that are collated. The outer coating upon each one of such staples, including the coated staple 30, may be advantageously used to collate the staples by applying the coating to the staples after the staples have been placed in a serial side-to-side relationship with respect to one another.

Figure 6:
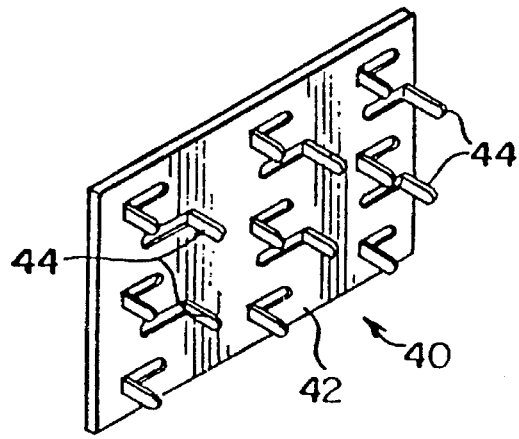
FIG. 6 is a simplified, perspective view of a truss plate constituting a further embodiment of this invention.

A coated truss plate 40, as shown in FIG. 6 constitutes yet another embodiment of this invention.

The coated truss plate 40 is formed from a planar member 42, from which a plurality of pointed teeth 44 are struck. The truss plate 40 usually is made of carbon steel, such as for example AISI C 1008 steel. Preferably, the truss plate 40 is covered in its entirety with an inner zinc layer, as described above, an intermediate chromium conversion layer, as described above, and an outer coating, as described above.

The coated truss plate 40 may alternatively be made from a galvanized, that is, zinc-coated, steel sheet, which sheet has been galvanized in accordance with a hot-dip or other process. When the teeth 44 are struck from the planar member 42, the edges of the teeth 44 and the edges of the openings left within the planar member 42 by means of the struck teeth 44 are exposed without any zinc coating disposed upon the exposed edges. In order to therefore provide corrosion protection for the exposed edges, the truss plate 40 may be immersed within a phosphating bath so as to apply a phosphate coating upon the exposed edges as well as upon the other parts of the metal body. A zinc phosphate coating is preferred. An iron phosphate coating may be alternatively be applied. Next, an intermediate chromate conversion layer, as described above, and an outer, coating, as described above, are applied to the truss plate 40 in its entirety. The intermediate chromium conversion layer may optionally be omitted.

EXAMPLE 2

Preparation of a Coated Fastener

Nails made of AISI C 1008 steel are first cleaned within an alkaline earth metal bath, rinsed, pickled in an acidic bath, rinsed, galvanized, and rinsed again. The nails are galvanized so as to comply with ASTM Specification A641, Class 1, Type 2. Next, a chromate conversion layer is applied to the nails. Thereafter, the thus treated nails are rinsed and over-coated.

Nails which have been galvanized and chromated are preferred to be coated with the coating of the present invention. It is envisioned that the composition can be applied to fasteners that have not been galvanized or chromated but upon which the properties imparted by means of the coating would be desirable.

The nails are collated into coils by means of the wires 22. The coils are dipped into a bath of the coating composition as described in Example 1 above, so as to provide a dry coat thickness of approximately 0.5 mm to 1.5 mm. The coating composition has a viscosity of less than approximately 100 cps. The coating is dried within a circulating air atmosphere at approximately ambient temperature, preferably approximately 60° F. (15° C.) to 100° F. (38° C.).

Due to the manner in which the coating is applied to the nails, bridges of coating between the nails may form even though the coating composition has a low viscosity. These bridges of coating harden as the coating is dried. These bridges could be problematic if they were too rigid and therefor not easily broken. For example, a coated coil of nails that is placed within a magazine of a driving tool would be unsatisfactory if the coating bridges caused the nails to bind within the magazine. Also, if the bridges, when broken, removed portions of the coating upon the fastener, the fastener would be less effective for its intended purpose.

Because the copolymer/thermoplastic resin coating is brittle when dried, the bridges that form during the coating process can be easily broken without damaging the coating upon the fastener itself. The desired brittleness is provided by means of the styrene monomer within the copolymer.

The coated fastener has a demonstrated affinity for plaster and plaster-like materials. The nails are thus particularly suited for use in connection with drywall or plasterboard applications so as to fasten the plasterboard to wooden frames. After the plasterboard is fastened, a plaster spackling compound is applied over the seams and the exposed nail heads so as to develop a uniform surface. If the spackling compound does not adhere to the nail head it may be visible through the overcoat, or a pocked or otherwise uneven surface could result. The appearance of the resulting surface could result. The appearance of the resulting surface would be unacceptable. Because the coating composition of the present invention has a demonstrated affinity for plaster-like materials, the spackling compound or other plaster based overcoat adheres to the fastener head and the desired uniform overcoat appearance is obtained.

Various modifications may be made in the coating composition, coated metal fastener or method of coating without departing from the spirit and scope of the invention, as defined in the appended claims.

I claim:

1. A process for coating a metal fastener, comprising the steps of:

providing a reservoir of a coating composition that comprises a uniform mixture, of a copolymer of styrene and maleic anhydride wherein the ratio of said styrene to said maleic anyhydride within said copolymer is approximately 1:1 to 3:1, and a thermoplastic resi uniformly dissolved within an organic solvent selected from the group consisting of aromatic solvents, ketones, chlorohydrocarbons, and mixtures thereof;

dipping a metal fastener into said reservoir containing said coating composition such that said coating composition is coated upon said metal fastener; and curing said coating composition coated upon metal fastener under atmospheric conditions at approximately ambient temperature.

2. The process of claim 1 wherein the thermoplastic resin is polyvinyl acetate.

3. The process of claim 1 wherein:

the ratio of said copolymer is said thermoplastic resin within said reservoir is approximately 20:80 to 80:20 parts by weight.

4. A process as set forth in claim 1 wherein:

said copolymer is present at approximately 4–15% by weight of said coating composition.

5. A process as set forth in claim 1 wherein:

said thermoplastic resin is present at approximately 3–16% by weight of said coating composition.

6. A process as set forth in claim 1 wherein:

said coating composition is approximately 70–95% by weight organic solvent.

7. A process as set forth in claim 1 wherein:

said organic solvent is a mixture or toluene, methylethylketone, and 1,1,1 trichloroethane.

8. A process as set forth in claim 1 wherein:

said polymeric coating has a thickness within the range of approximately 0.2–2 millimeters.

9. A process for coating a metal fastener, comprising the steps of:

providing a reservoir of a coating composition that comprises a uniform mixture, of a copolymer of an aromatic monomer and a monomer with a $\alpha,\beta$ unsaturation with carboxyl groups, said $\alpha,\beta$ unsaturated monomer being selected from the group consisting of maleic acid, furmaric acid, and maleic anhydride, and a thermoplastic resin, uniformly dissolved within an organic solvent selected from the group consisting of aromatic solvents, ketones, chlorohydrocarbons, and mixtures thereof;

dipping a metal fastener into said reservoir containing said coating composition such that said coating composition is coated upon said metal fastener; and curing said coating composition upon said metal fastener under atmospheric conditions at approximately ambient temperature.

10. The process as set forth in claim 9, wherein:

said aromatic monomer is selected from the group consisting of styrene, vinyl toluene, p-methylstyrene, $\alpha$-methylstyrene, and divinyl benzene.

11. The process as set forth in claim 10, wherein:

said aromatic monomer is styrene.

12. The process as set forth in claim 9 wherein:

said monomer with α,β unsaturation is maleic anhydride.

13. The process as set forth in claim 9 wherein:

said thermoplastic resin is polyvinyl acetate.

14. The process as set forth in claim 9 wherein:

said aromatic solvent is toluene.

15. A process as set forth in claim 9 wherein:

said ketone is methylethylketone.

16. A process as set forth in claim 9 wherein:

said organic solvent is a mixture of toluene, methylethylketone, and 1,1,1 trichloroethane.

17. A process as set forth in claim 9 wherein:

the ratio of said copolymer to said thermoplastic resin within said reservoir is approximately 20:80 to 80:20 parts by weight.

18. A process as set forth in claim 12 wherein:

said aromatic monomer is styrene, and the mole ratio of said styrene monomer to said maleic anhydride monomer within said copolymer is approximately 1:1 to 3:1.

19. A process as set forth in claim 9 wherein:

said copolymer is present at approximately 4–15% by weight of said coating composition.

20. A process as set forth in claim 9 wherein:

said thermoplastic resin is present at approximately 3–16% by weight of said coating composition.

21. A process as set forth in claim 9 wherein:

said coating composition is approximately 70–95% by weight organic solvent.

22. A process as set forth in claim 9, wherein:

said polymeric coating has a thickness within a range of approximately 0.2–'millimeters.

* * * * *